United States Patent Office 3,100,737
Patented Aug. 13, 1963

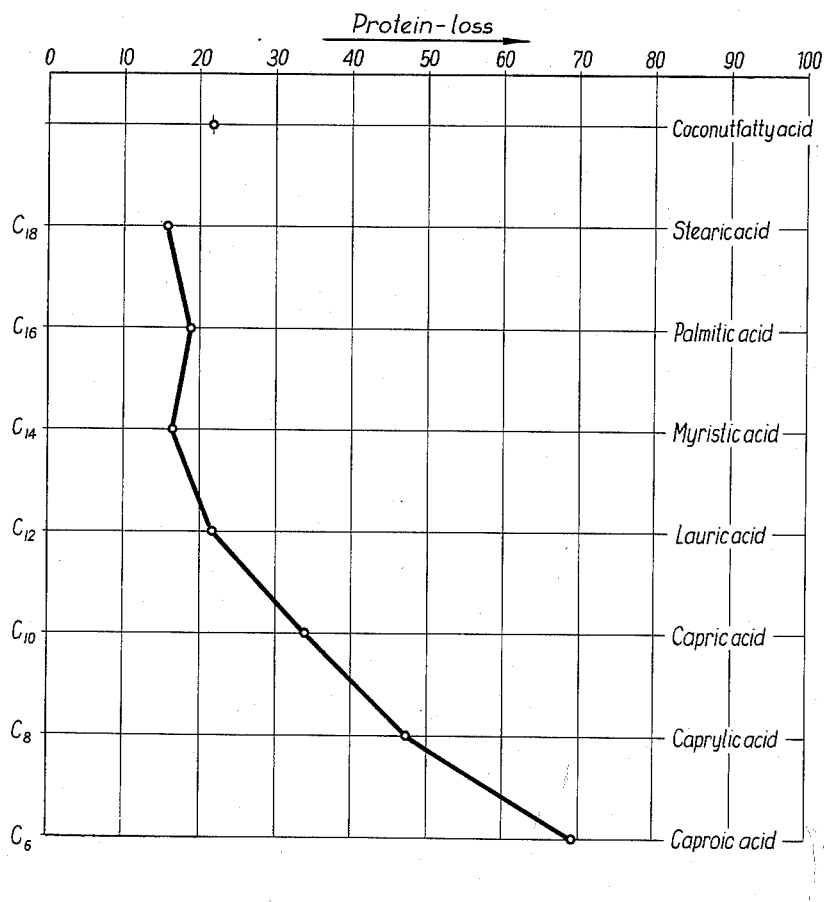

3,100,737
METHOD OF PREPARING A PLASMA PROTEIN SOLUTION FREE OF ACTIVE HEPATITIS VIRUS AND PRODUCT PRODUCED THEREBY
Wilhelm Auerswald, Wachringerstrasse 22, Vienna IX, Austria, and Johann Eibl, Webilebengasse 1, Vienna IV, Austria
Filed Nov. 2, 1961, Ser. No. 149,663
Claims priority, application Austria Feb. 5, 1958
5 Claims. (Cl. 167—74)

The present invention relates to a method of preparing a heat-stable plasma protein solution free of active hepatitis virus from human blood liquor such as plasma or serum. More particularly, the present invention relates to a method of preparing plasma protein solutions for infusion purposes with a maximum content of blood proteins as present in the original liquor.

This is a continuation-in-part of application Serial Number 731,630, filed April 29, 1958, entitled: Plasma Protein Solution Free of Active Hepatitis Virus and Method of Preparing Same, now abandoned.

Plasma protein solutions are used for infusion purposes in cases of shock, dangerous diminution of circulation plasma volume, hypoproteinemia, etc. These solutions must be repeatedly administered without danger of anaphylaxia reactions. These solutions are prepared from human blood liquors, such as blood plasma or blood serum containing human plasma porteins, by means of a fractionation technique. The plasma protein solutions have the advantage of tolerating storage in liquid state at room temperature. As the raw material of plasma preparations, i.e. the human pooled blood from more than five donors, contains with a high degree of probability the virus of the homologous serum hepatitis, since it is a well known fact that there are a high number of carriers of the hepatitis virus without clinical manifestations, measures are imperative to eliminate this virus from the plasma protein solution through adequate methods of inactivation.

The way, the efficacy of which for inactiviating the homologous serum hepatitis virus present in human plasma or serum has been proved, is a ten hours treatment at 60° C., and for this reason the minimum requirements of the health authorities of many countries, especially of the United States of America, include requirements for carrying out such a heat treatment. In order to obtain a clinically safe plasma protein solution, all those plasma proteins which do not withstand such a heat treatment without physicochemical changes have to be removed from the plasma before the heat-sterilizing step.

The protein fractions in human blood liquor include albumin, gamma-globulin, alpha-globulin, and beta-globulin. Albumin is a heat-stable fraction; gamma-globulin is a heat-unstable fraction. Alpha-globulin and beta-globulin, however, contain a heat-stable portion as well as a heat-unstable portion. The heat-unstable portions of the alpha-globulin and the beta-globulin have to be removed before the heat-treatment, while their heat-stable portions should be maintained in the final product.

Former attempts for the removal of heat-unstable protein fractions did not give satisfactory results. One group of workers in this field tried to remove labile plasma proteins by precipitating them with heavy metal salts, such as zinc salts, while another group attempted the removal of the heat-unstable proteins by de-salting the plasma or serum with the aid of ion exchange methods. A third group succeeded in obtaining a heat-stable plasma protein solution by using a modification of the first-mentioned method including an ethanol fractionation. In this manner it is possible to produce gamma-globulin at the same time.

The disadvantage of the first of the aforementioned three methods arises primarily from the fact that no gamma-globulin preparation may be obtained which is guaranteed free of the homologous serum hepatitis virus.

In addition to the same disadvantage as the first method, the second of the aforementioned processes results in a finished product which contains isoagglutinins, and physicochemical changes which take place upon heating the product to 60° C.

As far as is known, the third-mentioned method, which results in the recovery of uncontaminated gamma-globulin, has not been reported as producing a preparation that is free from isoagglutinins and conglutinins, and what, if any, physicochemical changes in the antigenic structure take place when the preparation is heated to 60° C.

The principal object of the present invention is to provide a plasma protein solution which may be subjected to a ten hours treatment at 60° C., without any risk of undesired changes and method for producing same.

It is a special object of the invention to eliminate only the heat-unstable globulin fractions, while a maximum content of the heat-stable fractions, i.e. the heat-stable albumin and the heat-stable portions of the alpha-globulin and beta-globulin, is maintained in the final product.

It is a further object of the present invention to separate from the blood liquor and recover the gamma-globulin fraction which is a valuable therapeutical substance.

It must be borne in mind that, in order to prepare a plasma portein solution which is not only satisfactory in every other respect, but lends itself to a subsequent heating to 60° C. for an extended period of time, the following requirements must be met:

(a) During the course of preparation of the plasma protein solution, no change or alteration should be induced in these proteins that are to remain in the finished, stable plasma protein solution;

(b) The plasma protein solution must possess such a degree of stability that, after heating for a period of ten hours to 60° C., no perceptible physiocochemical changes should have taken place, such as, for example, changes in viscosity, optical density and turbidity or changes in the partial refraction index increments after electrical or gravitational separation;

(c) The finished plasma protein solution must be free of alpha-isoagglutinins and beta-isoagglutinins and of all other antibodies which react with human erythrocytes;

(d) The finished plasma protein solution must be free of conglutinins so that, upon infusion, no congultination of sensitized erythrocytes occurs, whereby it is assumed, of course, that the recipient's blood itself is free of conglutinating erythrocytes charged with incomplete antibodies;

(e) Recovery of gamma-globulin, uncontaminated by the virus of homologous serum hepatitis should be possible.

According to the present invention, these and other objects are achieved by adding to the blood liquor, such as plasma or serum, a soluble inorganic neutral salt and a monobasic fatty acid selected from fatty acids having 12 to 18 carbon atoms, heating the mixture to a temperature of about 55° C. at a pH value of about 5.2, precipitating thereby all protein fractions being unstable at said temperature, removing the precipitate, separating the heat-stable proteins from the inorganic neutral salt contained in the remaining solution and treating the separated heat-stable proteins to obtain a solution having a content of 2 to 10 percent of proteins, adjusting the pH value of this solution to 7.0 to 7.2 and treating the heat-stable protein fractions contained in the resulting solution in the presence of a stabilizer at a temperature of about 60° C. during a period of about ten hours.

The preferred inorganic neutral salt is ammonium sulfate which may be added in an amount to obtain a concentration of 30 to 50 percent of a saturated ammonium sulfate solution. The term "30 to 50 percent of a saturated ammonium sulfate solution" means that the solution contains 30 to 50 percent of the saturation content at a given temperature. As a saturated ammonium sulfate solution contains 75 percent by weight ammonium sulfate at a temperature of 20° C., the above-mentioned range of 30 to 50 percent of a saturated solution at 20° C. corresponds to a range of 22.5 to 37.5 percent by weight.

In carrying out the method, it is generally satisfactory to use a fatty acid containing 12 to 18 carbon atoms in its molecule or a mixture thereof. Coconut-fatty acid, i.e. the mixture of the natural fatty acids contained in coconut oil, is preferred.

The ammonium sulfate and the fatty acid may be added in random succession or simultaneously. Employing the step-wise addition, it is preferred to add ammonium sulfate at first and the fatty acid thereafter. This step-wise addition enables the recovery of fibrinogen and of gamma-globulin, which substances are therapeutically valuable by-products of the method according to the invention.

The time of action of the ammonium sulfate and of the fatty acid at the temperature and pH values mentioned above should not exceed one hour. Best results are obtained with a reaction period between 15 and 30 minutes.

After the removal of the precipitated heat-unstable protein fractions, only ammonium sulfate and the heat-stable protein fractions, i.e. those proteins which, as has been mentioned before, withstand a treatment at 60° C. for a period of 10 hours in the presence of a stabilizer without denaturation or undesired physicochemical changes, are contained in the remaining solution.

As ammonium sulfate must not be present in infusion solutions, the heat-stable proteins and the ammonium sulfate have to be separated. This separation may be effected in several manners: The solution may be dialysed or ion-exchanged to remove the ammonium sulfate, or the solution may be treated with a precipitating agent such as alcohol or a neutral salt to precipitate the heat-stable proteins. Preferably the separation is carried out by increasing the concentration of ammonium sulfate to 70 percent of a saturated solution, whereby the heat-stable proteins are precipitated.

Independent of the particular kind of separation of the heat-stable proteins from the ammonium sulfate contained in the solution remaining after the removal of the heat-unstable proteins, the heat-stable proteins finally have to be present in a solution which is physiologically compatible, i.e. a solution having a protein content of 2 to 10 percent, preferably 3 to 5 percent, and a pH of 7.0 to 7.2. Therefore, in the case of precipitation with a precipitating agent, the proteins have to be dissolved in water, and the pH has to be adjusted. The concentration of sodium ions must not exceed 0.15 mol.

The so prepared solution finally is heat-treated in the presence of a conventional stabilizer during ten hours, at a temperature of 60° C. Suitable stabilizers are 0.008 molar sodium caprylate or 0.004 molar acetyl tryptophanate+0.004 molar sodium caprylate.

As has been mentioned before, a modification of the method according to the invention for recovery of gamma-globulin comprises adding to the plasma ammonium sulfate in an amount to obtain a concentration of not more than 50 percent of a saturated solution, holding the mixture at room temperature at a pH value of 6.0 to 8.0 during a period sufficient to precipitate a portion of the proteins consisting predominantly of gamma-globulin, removing the precipitate and adding to the filtrate a monobasic fatty acid selected from fatty acids having 12 to 18 carbon atoms, adjusting the pH value of the mixture to about 5.2 and heating the mixture to a temperature of about 55° C., whereupon the process is continued as described before to obtain a sterilized, stable plasma protein solution.

According to another modification of the process of the invention, fibrinogen and gamma-globulin are fractionally separated before the heat-unstable protein fractions are removed from the solution.

In accordance with the specific modification of the method of the invention applied, i.e. the modifications with or without the recovery of fibrinogen and/or gamma-globulin, various pH values of the starting materials may be used. If fibrinogen as well as gamma-globulin are to be recovered as by-products, the original plasma may be adjusted to pH=7.0. Then ammonium sulfate is added until a concentration of 22 percent of a saturated solution is reached, whereby fibrinogen is precipitated. More ammonium sulfate may be added up to a concentration of 45 percent, whereby a protein fraction containing the gamma-globulin is precipitated. Subsequently the fatty acid is added, the pH adjusted to 5.2, and the temperature is raised to 55° C., under which conditions the heat-unstable fractions are precipitated. The remaining solution is further treated, in the manner as described above, to obtain a physiologically compatible solution.

If only gamma-globulin is to be recovered, human serum having a pH value of 6.0 may be used as starting material. Ammonium sulfate is added to obtain at once a concentration of 45 percent of a saturated solution, whereby a portion of the proteins consisting mainly of gamma-globulin is precipitated. The further steps are the same as described above, viz. the fatty acid is added, the pH adjusted to pH=5.2, and the temperature raised to 55° C., whereby the heat-unstable proteins are precipitated, before the heat-stable proteins are separated from the ammonium sulfate.

If neither fibrinogen nor gamma-globulin need to be recovered, it is necessary to start with a higher pH value of the starting material, e.g., pH=8.0. To this solution the fatty acid is added and ammonium sulfate is supplied in such an amount to obtain a concentration of 45 percent of a saturated ammonium sulfate solution. Again the pH is adjusted to 5.2 to 5.3, and the solution is heated to 55° C. In this case, the precipitate contains gamma-globulin as well as the heat-unstable protein fractions.

The above-mentioned modifications of the method of the invention are further illustrated by the following three schemes:

SCHEME I

Starting material
Human Plasma
│
Adjustment of pH to a value of 7.0
│
Addition of ammonium sulfate solution up to a concentration of 22%
├── Precipitate starting material for prep. of Fibrinogen
└── Supernatant containing albumin and all serum globulins
    │
    Addition of ammonium sulfate solution up to a concentration of 45%
    ├── Precipitate starting material for prep. of Gamma Globulin
    └── 45% am. sulf. supernatant containing albumin and alpha- and beta-globulins
        │
        Addition of coconut fatty acid
        │
        Adjustment of pH to 5.2
        │
        Temperature up to 55° C. during 20 minutes
        ├── Precipitate containing unstable alpha- and beta-globulins, to be discarded
        └── Supernatant containing albumin and stable alpha- and beta-globulins
            │
            Addition of ammonium sulfate up to a concentration of 70%
            ├── Filtrate to be discarded
            └── Precipitate containing the above proteins in concentrated form
                │
                Dialysis in order to remove ammonium sulfate ions
                │
                Adjustment of pH, sodium ions and concentration to physiological values
                │
                Addition of stabilizer for heat inactivation/sodium caprylate and acetyl tryptophanate 0.004 molar each
                │
                Bottling
                │
                Heat inactivation at 60° C. during ten hours
                │
                Testing for innocuity, sterility, absence of pyrogenic substances

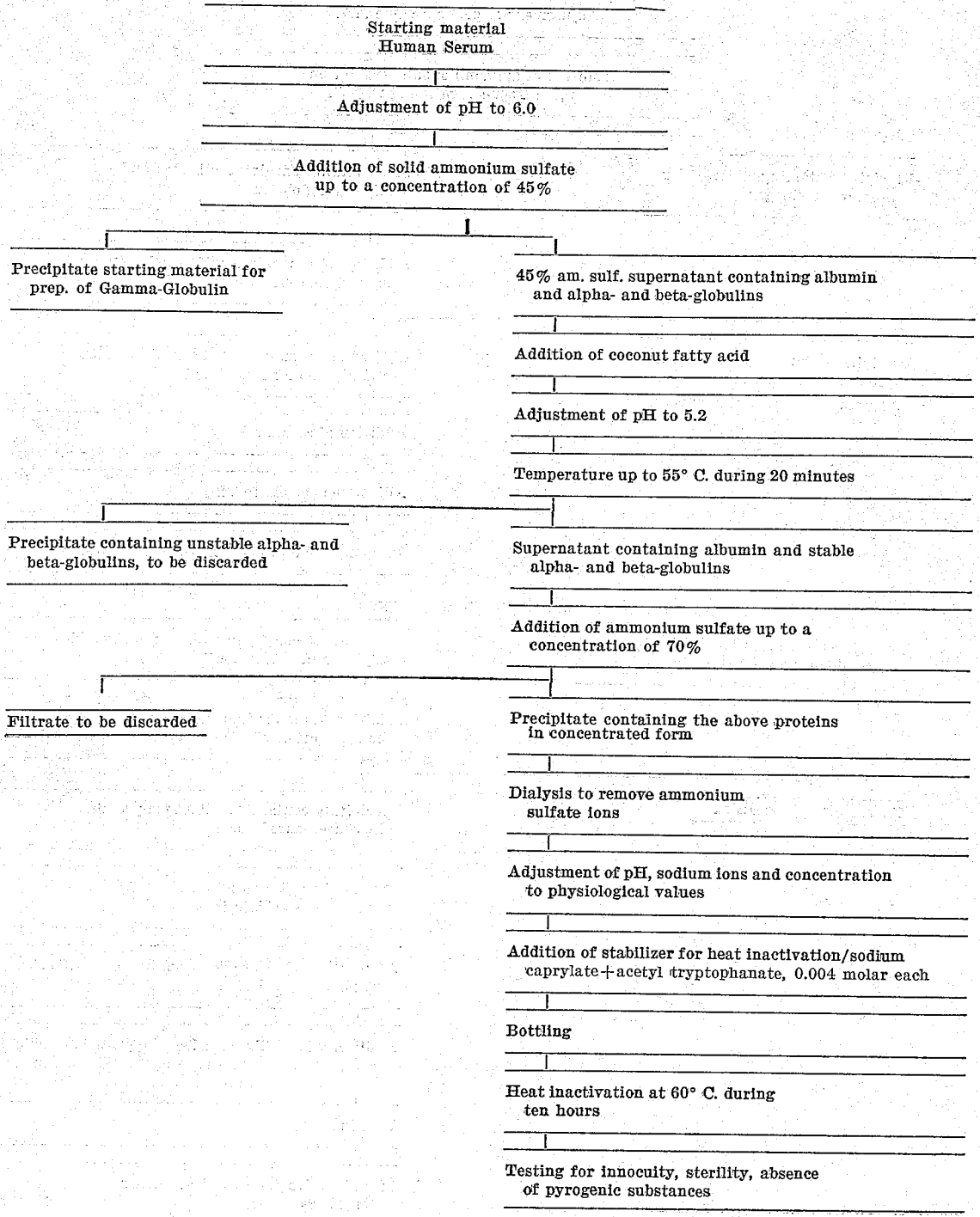

SCHEME III

```
                    Starting material
                     Human Serum
                           |
                Adjustment of pH to 8.0
                           |
              Addition of coconut fatty acids
                           |
         Addition of ammonium sulfate solution
              up to a concentration of 45%
                           |
                Adjustment of pH to 5.3
                           |
                  Temperature up to 55° C.
                     during 30 minutes
                           |
          ┌────────────────┴────────────────┐
Precipitate containing in denatured    Supernatant containing albumin and stable
form all gamma-globulins and            alpha- and beta-globulins
unstable alpha- and beta-globulins—                   |
To Be Discarded!                        Addition of ammonium sulfate up to a
                                           concentration of 70%
          |                                           |
   Filtrate to be discarded              Precipitate containing the above proteins
                                            in concentrated form
                                                      |
                                        Dialysis in order to remove ammonium
                                           sulfate ions
                                                      |
                                        Adjustment of pH, sodium ions and concentration
                                           to physiological values
                                                      |
                                        Addition of a stabilizer for heat inactivation/sodium
                                           caprylate+acetyl tryptophanate 0.004 molar each
                                                      |
                                        Bottling
                                                      |
                                        Heat inactivation at 60° C. during
                                           ten hours
                                                      |
                                        Testing for innocuity, sterility, absence
                                           of pyrogenic substances
```

The method according to the invention is explained more in detail in the following examples, without thereby restricting the scope of the invention.

Example 1

440 liters of human plasma, free of pyrogens which have been determined by testing according to U.S. Pharmacopeia XV and the respective values of which are:

| | |
|---|---|
| Total nitrogen | 0.9 gm. percent N. |
| Isoagglutinins— | |
|     Anti A | 1:4. |
|     Anti B | 1:8. |
| Conglutinins | 1:1. |
| Protein fractions— | |
|     Albumin | 56 rel. percent. |
|     Alpha$_1$-globulins | 4.2 rel. percent. |
|     Alpha$_2$-globulins | 8.5 rel. percent. |
|     Beta-globulins | 13 rel. percent. |
|     Fibrinogen | 5.6 rel. percent. |
|     Gamma-globulin | 12.7 rel. percent. | are mixed with 127 liters of saturated ammonium sulfate solution. The pH should not be lowered under pH 7. The precipitate which forms consists mainly of fibrinogen and may be separated by centrifugation from the supernatant liquid. Then the ammonium sulfate concentration is increased to 45 percent of a saturated solution by adding 236 liters of saturated ammonium sulfate solution. The mixture is held overnight at room temperature and then 10 liters of Hyflo Supercel are admixed with stirring and the fluid is filtered through filter paper.

The precipitate consisting predominantly of gamma-globulin may be used as starting material for the recovery of pure gamma-globulin. For this purpose the precipitate may be dissolved in water and worked off according to one of the usual methods, such as the Cohn method. 2100 grams of coconut fatty acid are added slowly to the filtrate with stirring. The pH value of the mixture is adjusted to about 8.0 by adding 2-normal Na$_2$CO$_3$ solution. After adding 800 cc. of n-octyl alcohol in order to avoid foaming, the pH is rapidly reduced by means of acetic or mineral acids, whereby care must be taken that the pH value does not drop below 5.2. After heating to 55° C. and maintaining this temperature for twenty minutes, five liters of loosely packed filter cel are stirred into the mixture which is then filtered. The precipitate so obtained contains all protein fractions being unstable at a temperature of 55° C., and the filtrate contains all protein fractions being stable at this temperature, such as the albumin fraction and the heat-stable alpha-globulin and beta-globulin fractions.

The heat-stable protein fractions contained in the filtrate are purified by precipitating and re-dissolving. For this purpose, the clear, slightly yellowish filtrate is treated with ammonium sulfate in solid form which causes the formation of a voluminous precipitate. The addition of ammonium sulfate is continued until the formation of the precipitate ceases. In the instant example, the amount of ammonium sulfate is 0.32 kg. per 1.0 liter. The precipitate is separated from the clear liquid by filtration and kept refrigerated overnight. The precipitate is cleared of ammonium sulfate either by dialysis in cellulose bags against running tap water or by means of an ion-exchanger, i.e. the solution is passing over a mixed bed of cationic and anionic synthetic resin exchangers such as Amberlite. The resulting salt-poor protein solution is brought to the required protein concentration (in this example 3.5 grams percent) by dialysis against a highly osmotic polyvinyl-pyrrolidone solution, and the fine adjustment of the concentration is undertaken by means of pyrogen-free water. In order to obtain a sterile protein solution, the solution is filtered through a bacteria-tight filter of the Seitz type.

In order to obtain a protein solution for infusion purposes, the pH and the osmotic pressure must be adjusted to the respective values of the human blood. For this purpose NaOH 0.1-molar or HCl 0.1-molar is cautiously added with continuous stirring and control with a Beckman pH-meter until the range pH 7.0 to 7.2 is reached. Then 20 percent sodium chloride solution is added in the proportion 1:22. With respect to the heat-inactivation procedure a stabilizer is added in the form of sodium caprylate until a concentration of 0.004 mol is reached and acetyl tryptophanate until a concentration of 0.004 mol is reached. Consequently, a final sterilization is undertaken by filtration through Seitz pads in Seitz filtration equipment.

The freedom from isoagglutinins is determined by mixing a sample with A and B group erythrocytes, where no agglutination must be observed. The absence of conglutinins is proved by mixing a sample with $Rh_o$ positive erythrocytes of blood group O which are sensitized with incomplete $Rh_o$-antibodies, where during a 30 minute incubation at 37° C. no agglutination must appear. Sterility and freedom from pyrogenic substances is checked according to the U.S. Pharmacopeia XV. During the performance of these testing procedures, the plasma protein solution is held under sterile conditions at room temperature.

Upon the return of test results of the nature of the foregoing, indicating the innocuous character, the plasma protein solution is distributed into appropriate containers under conditions of absolute sterility and there heated for ten hours immersed in a water bath of 60° C. in order to inactivate any homologous serum hepatitis virus that may be present.

After checks for sterility and innocuity on mice and rabbits, samples were clinically evaluated. Clinical evaluation is based on compatibility, for which purpose the temperature of the recipient on an intravenous application of 250 ml. of the plasma protein solution is carefully checked and registered over a period of four hours. In addition, intradermal injections of 0.1 cc. of the plasma protein solution are given to both previously untreated human patients and to patients who three weeks earlier received an amount of plasma protein solution representing at least 8 g. of protein. The batch passes examination provided the wheals caused by intradermal reaction in either case do not exceed the wheals caused by a simultaneous intradermal administration of 0.9 percent sterile, pyrogen-free sodium chloride solution.

*Example 2*

100 liters of human serum are diluted with 50 liters of sterile, pyrogen-free water. The pH of this solution is adjusted to 6.0 by adding 2.550 gms. solid ammonium sulfate per liter. The solution is stirred for one hour to insure that all the ammonium-sulfate crystals are dissolved, and about 40 percent of the serum proteins, being mainly gamma-globulin, are precipitated. This precipitate may be used as starting material for the preparation of gamma-globulin.

The process is continued as described in detail in Example 1.

*Example 3*

55 liters of pure human serum which is free of pyrogens and the respective values of which are the same as given in Example 1 are diluted with 45 liters of sterile, pyrogen-free, distilled water with stirring. 130 grams of coconut fatty acid is then added slowly while stirring is continued. The pH is adjusted to 8.0 by adding 2-normal $Na_2CO_3$ solution to the mixture. After adding saturated ammonium sulfate solution until a concentration of 45 percent is reached and adding 100 cc. of n-octyl alcohol in order to avoid foaming, the solution is stirred for 30 minutes. The pH is rapidly reduced to pH 5.3 by adding normal acetic acid (2800 ml.). The solution is gently heated under continuous stirring up to a temperature of 55° C., and this temperature is maintained for 30 minutes. Ten liters of Hyflo Supercel are then added and the whole mixture is filtered. The ammonium sulfate concentration of the solution is increased to 70 percent by adding 320 gms. of solid ammonium sulfate per liter solution. Then the precipitate consisting of the heat-stable proteins is separated from the clear liquid by filtration and kept refrigerated overnight.

The precipitated heat-stable protein are purified from ammonium sulfate by dialysis and resolved in a sufficient amount of water to obtain the desired protein concentration of 3 to 5 percent. The solution is filtered through a bacteria-tight filter, and the pH is adjusted to 7.0 to 7.2 as described in Example 1. The solution so prepared is subjected to a heat treatment at a temperature of 60° C. and for a period of ten hours to obtain a protein solution for infusion purposes.

In order to further show the applicability of the fatty acids having 12 to 18 carbon atoms per molecule in comparison to the use of fatty acids having less than 12 carbon atoms, the following experiments were carried out:

78 parts of human pooled citrated plasma (pool No. AQ), the respective values of which were:

Total nitrogen_____ 1.05 gms. percent N.
Isoagglutinins—
    Anti A_____ 1:4.
    Anti B_____ 1:8.
Conglutinins_____ 1:1.
Protein fractions—
    Albumin_____ 54 rel. percent.
    $Alpha_1$-globulins_____ 4.1 rel. percent.
    $Alpha_2$-globulins_____ 9.0 rel. percent.
    Beta-globulins_____ 12.6 rel. percent.
    Fibrinogen_____ 5.3 rel. percent.
    Gamma-globulins_____ 15.0 rel. percent.

were mixed with 22 parts of saturated ammonium sulfate solution. The pH value was adjusted to pH 7. Fibrinogen was precipitated and removed. Then 41.8 parts of saturated ammonium sulfate solution were added to obtain a concentration of 45 percent of a saturated ammonium sulfate solution, and a fraction predominantly consisting of gamma-globulin was precipitated and removed. The solution so obtained which contained alpha-globulin, beta-globulin, and albumin, was divided into eight equal portions.

0.3 cc. of:

(1) Coconut fatty acid
(2) Pure stearic acid ($C_{18}$)
(3) Pure palmitic acid ($C_{16}$)
(4) Pure myristic acid ($C_{14}$)
(5) Pure lauric acid ($C_{12}$)
(6) Pure capric acid ($C_{10}$)
(7) Pure caprylic acid ($C_8$)
(8) Pure caproic acid ($C_6$)

per 100 cc. solution was added to the respective portions, and the pH value adjusted to pH 5.2. Then the experimental solutions were heated to 55° C. and held at this temperature for twenty minutes.

From each of the eight portions a precipitate was separated which contained alpha-globulins and beta-globulins unstable at this temperature. The total protein nitrogen content was determined before and after the precipitation with the fatty acids, and from the values obtained the protein content before and after the precipitation was calculated. In the following table the protein losses are given in dependence on the kind of fatty acid employed.

TABLE I

| | First test | | Second test | | |
|---|---|---|---|---|---|
| | Protein after denaturation, percent | Yield, percent | Protein after denaturation, percent | Yield, percent | Average protein loss, percent |
| (1) Coconut fatty acid | 1.34 | 76.5 | 1.38 | 79 | 32.5 |
| (2) Stearic acid | 1.44 | 82 | 1.49 | 85 | 16.5 |
| (3) Palmitic acid | 1.40 | 80 | 1.45 | 83 | 18.5 |
| (4) Myristic acid | 1.42 | 81 | 1.49 | 85 | 17 |
| (5) Lauric acid | 1.38 | 79 | 1.34 | 76.5 | 32.5 |
| (6) Capric acid | 1.18 | 67.5 | 1.14 | 65 | 44 |
| (7) Caprylic acid | 0.87 | 50 | 0.96 | 55 | 47.5 |
| (8) Caproic acid | 0.57 | 32.5 | 0.53 | 30.5 | 69.5 |

The supernatant of each sample was further processed as described in Scheme I, in the above, viz. the ammonium sulfate concentration was increased to 70 percent, the remaining proteins were precipitated, dialyzed, and sodium caprylate+acetyl tryptophanate was added as stabilizer. Then the solution was bottled and heat inactivated during ten hours at a temperature of 60° C. Subsequently, the final tests for applicability were carried out. Moreover, the viscosity of the finished product was determined and compared with the viscosity values obtained before the heat treatment at 60° C. during 10 hours. The comparative figures are given in the following table.

TABLE II

| Fatty acid employed | Viscosity before heat inactivation, centipoise | Viscosity after heat inactivation, centipoise |
|---|---|---|
| Coconut fatty acid | 1.15 | 1.17 |
| Stearic acid | 1.15 | 1.17 |
| Palmitic acid | 1.15 | 1.17 |
| Myristic acid | 1.125 | 1.15 |
| Lauric acid | 1.16 | 1.17 |
| Capric acid | 1.15 | 1.20 |
| Caprylic acid | 1.135 | 1.17 |
| Caproic acid | 1.15 | 1.165 |

The table shows that the final viscosity is substantially the same before and after the heat inactivation, from which it is evident that the products are stable.

The values given in Tables I and II and in the drawing are mean values obtained from double tests.

As is apparent from the data, the selection of fatty acids of a range of 12 to 18 carbon atoms per molecule constitutes an essential progress with respect to the precipitation of unstable alpha-globulin and beta-globulin fractions, as compared to lower fatty acids. The tables show that on using fatty acids having 12 to 18 carbon atoms per molecule the protein losses are at a minimum, amounting to about 20 percent, while the use of a $C_{10}$ fatty acid (capric acid) results in losses of 30 percent, the $C_8$ fatty acid (caprylic acid) in losses of 50 percent, and the use of the $C_6$ fatty acid (caproic acid) results in protein losses of almost 70 percent.

On the other hand, the viscosity values ascertain that, in spite of a maximal yield of valuable proteins obtained by the method according to the invention, the stability of the plasma protein solution is not impaired. In other words, by the method according to the invention only the unstable proteins are removed, which are not capable of withstanding a ten hours heat treatment at a temperature of 60° C. without denaturation.

What is claimed is:

1. A method of preparing a heat-stable plasma protein solution free of active hepatitis virus from human plasma comprising adding to the plasma a soluble inorganic neutral salt and a monobasic fatty acid selected from fatty acids having 12 to 18 carbon atoms, heating the mixture to a temperature of about 55° C. at a pH value of about 5.2, precipitating thereby all protein fractions being unstable at said temperature, removing the precipitate, separating the heat-stable proteins from the inorganic neutral salt contained in the remaining solution, treating the separated heat-stable proteins to obtain a solution having a content of 2 to 10 percent of proteins, adjusting the pH value of this solution to 7.0 to 7.2, and treating the heat-stable protein fractions contained in the resulting solution in the presence of a stabilizer at a temperature of about 60° C. during a period of about 10 hours.

2. A method as set forth in claim 1 in which ammonium sulfate is used as neutral salt in a concentration of not more than 50 percent of a saturated ammonium sulfate solution.

3. A method as set forth in claim 1 in which the heat-stable protein fractions contained in the remaining solution are precipitated from this solution by adding an inorganic neutral salt to obtain a concentration up to 70 percent and are resolved in an aqeous medium before heat-sterilizing.

4. A method of preparing a heat-stable plasma protein solution free of active hepatitis virus from human plasma comprising adding to the plasma ammonium sulfate in an amount to obtain a concentration of not more than 50 percent of a saturated solution, holding the mixture at room temperature at a pH value of 6.0 to 8.0 during a period sufficient to precipitate a portion of the proteins consisting predominantly of gamma-globulin, removing the precipitate and adding to the filtrate a nonobasic fatty acid selected from fatty acids having 12 to 18 carbon atoms, adjusting the pH value of the mixture to about 5.2 and heating the mixture to a temperature of about 55° C., precipitating thereby a portion of alpha-globulin and beta-globulin being unstable at said temperature, removing the precipitate, separating the heat-stable proteins from the ammonium sulfate contained in the remaining solution and treating the separated heat-stable proteins to obtain a solution having a content of 2 to 10 percent of proteins, adjusting the pH value of this solution to 7.0 to 7.2, and treating the heat-stable protein fractions contained in the resulting solution in the presence of a stabilizer at a temperature of about 60° C. during a period of about 10 hours.

5. The produce produced according to the method of claim 1.

References Cited in the file of this patent

UNITED STATES PATENTS 2,765,299    Porsche _____ Oct. 2, 1956

OTHER REFERENCES

XIIth Conference on Blood Cells and Plasma Proteins, November 1957, Vox Sanguinis, S. Karger, N.Y., vol. 3, No. 1, 1958, pp. 68–69.

Chem. and Eng. News, vol. 30, No. 21, May 26, 1952, pp. 2218 and 2222.

J. Pharm. and Exptl. Therap., vol. 95, No. 5, April 1949, pp. 125, 132, 157, and 158.

J. of Clinical Invest., vol. 23, No. 4, July 1944, pp. 445–457.

Procs. Amer. Philosophical Soc., vol. 88, September 1944, p. 167.

Cohn: J. Am. Chem. Soc., vol. 62, pp. 3386–3393, 1940.

Tullis: Blood Cells and Plasma Proteins, Academic Press, New York, New York, pp. 362–372, 1953.

Rosenthal: J. Biol. Chem., vol. 70, pp. 129–131, 1926.